(12) United States Patent
Soda

(10) Patent No.: US 6,836,573 B2
(45) Date of Patent: Dec. 28, 2004

(54) DIRECTIONAL COUPLER TYPE OPTICAL MODULATOR WITH TRAVELING-WAVE ELECTRODE

(75) Inventor: Haruhisa Soda, Tokyo (JP)

(73) Assignee: FiBest KK, Tokyo (JP)

( * ) Notice: Subject to any disclaimer, the term of this patent is extended or adjusted under 35 U.S.C. 154(b) by 323 days.

(21) Appl. No.: 10/236,341

(22) Filed: Sep. 5, 2002

(65) Prior Publication Data

US 2004/0047529 A1 Mar. 11, 2004

(51) Int. Cl.[7] ............................................. G02F 1/035
(52) U.S. Cl. ............................................. 385/2; 385/29
(58) Field of Search ............................. 385/2, 16, 14, 385/15, 31, 37, 41, 122, 123, 130, 129, 27

(56) References Cited

U.S. PATENT DOCUMENTS

| | | | |
|---|---|---|---|
| 4,012,113 A | | 3/1977 | Kogelnik et al. |
| 5,850,098 A | * | 12/1998 | Butler et al. ................. 257/467 |
| 5,917,980 A | * | 6/1999 | Yoshimura et al. ........... 385/129 |
| 5,995,691 A | * | 11/1999 | Arai et al. ...................... 385/37 |
| 6,064,787 A | * | 5/2000 | Castoldi ......................... 385/41 |
| 6,091,864 A | * | 7/2000 | Hofmeister ...................... 385/2 |
| 6,338,975 B1 | * | 1/2002 | Yoshimura et al. ............ 438/29 |
| 6,534,725 B2 | * | 3/2003 | Tsukahara .................... 174/260 |
| 6,778,723 B1 | * | 8/2004 | Yang ............................. 385/16 |

OTHER PUBLICATIONS

Prof. F. Koyama et al., entitled "Frequency Chirping in External Modulators," *IEEE Journal of Lightwave Technology*, vol. LT–6, No. 1, pp 87–98 Jan. 1988.

Dr. R. C. Alferness et al., entitled "High Speed Traveling–Wave Directional Coupler Switch/Modulator for λ=1.32 μm," *IEEE Journal of Quantum Electronics*, vol. QE–19, No. 9, pp 1339–1341, Sep. 1983.

Lucas b. Soldano et al., "Optical Multi–Mode Interference Devices Based on Self–Imaging: Principles and Applications," *Jouirnal of Lightwave Technology*, vol. 13, No. 4, pp 615–627, Apr. 1995.

Dr. R.G. Waker et al., "Low–voltage, 50 ohm GaAs/AlGaAs Traveling–wave Modulator with bandwidth exceeding 25 GHz," Electronics Letters, 9 vol. 25, No. 23 pp. 1549–1550, Nov. 1989.

* cited by examiner

*Primary Examiner*—Thien M. Le
(74) *Attorney, Agent, or Firm*—Townsend and Townsend and Crew LLP; Kenneth R. Allen (57) ABSTRACT

A directional coupler type optical modulator with traveling-wave electrodes includes a first directional coupler region, a waveguide wave coupling region, a second directional coupler region, and a set of noncrossing traveling-wave electrodes disposed along the outside of the waveguides. The electrodes of each directional coupler are connected to the traveling-wave electrodes via air-bridges. The waveguide structures are of the P-I-N type having a common N-type conducting layer which provides delta-beta operation of the directional coupler, and both cross and bar states are controlled by a single input signal.

15 Claims, 12 Drawing Sheets

DIRECTIONAL COUPLER TYPE OPTICAL MODULATOR WITH TRAVELING-WAVE ELECTRODE

CROSS-REFERENCES TO RELATED APPLICATIONS

Not applicable

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

BACKGROUND OF THE INVENTION

This invention relates to optical switches or modulators and more particularly to an ultra-high speed optical modulator suitable for optical fiber transmission systems.

In order to extend the transmission distance at data rates of several Gb/s, a transmitter module with an external optical modulator is widely used due to its controllability and low chirp characteristics in order to minimize eye pattern degradation induced by the fiber dispersion. A semiconductor optical modulator is attractive because of its potentially small size and its low drive voltage. In a prior investigation reported in an article by Prof. F. Koyama et al., entitled "Frequency Chirping in External Modulators," *IEEE Journal of Lightwave Technology*, Vol. LT-6, No. 1, January 1988, it was proposed that an optical directional coupler modulator might be able to provide both zero chirp and controllable chirp characteristics.

In an article by Dr. R. C. Alferness et al., entitled "High-Speed Traveling-Wave Directional Coupler Switch/Modulator for λ=1.32 μm," *IEEE Journal of Quantum Electronics*, Vol. QE-19, No. 9, September 1983, it was reported that a simple directional coupler modulator using Ti:LiNbO3 material had operated at 7.2 GHz. As modulation frequency increases to the order of several GHz, a traveling wave electrode configuration is preferable because the cut-off frequency is not limited by a parasitic RC time constant.

Figure 1:
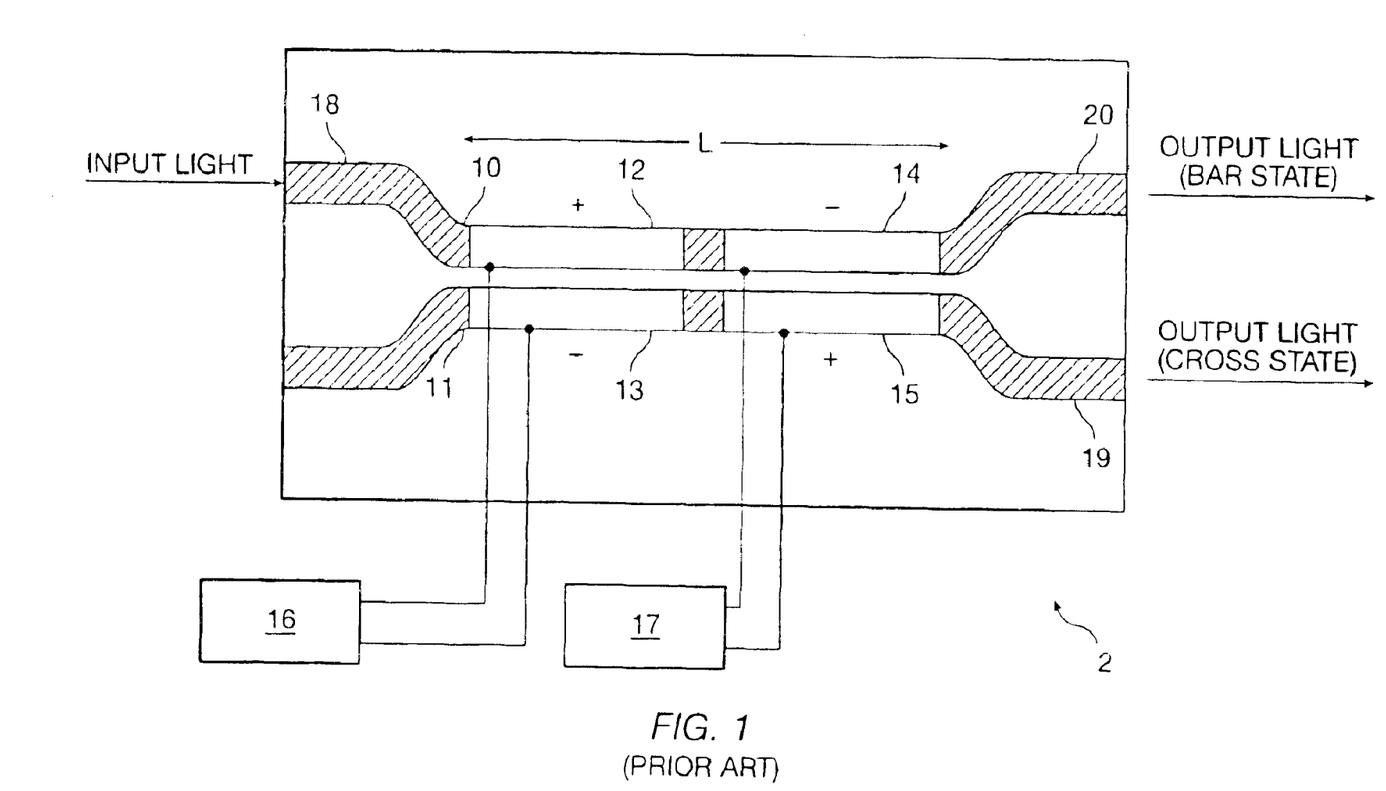
FIG. 1 is a prior art reverse delta beta type directional coupler modulator.

The structure of a prior reverse delta beta type directional coupler modulator 2 is shown in FIG. 1. The device 2 includes a pair of waveguides 10, 11 having mutually parallel electrodes 12, 13, 14, 15 in sufficient proximity for delta-beta switched directional coupling. To operate such a device, two electrical modulation signals from sources 16, 17 with opposite signs are required. For L larger than the coupling length of the directional coupler and shorter than three times the coupling length, cross state and bar state are obtained for specific applied voltages Vc and Vb. In the cross state, when the bias voltage is Vc, the input light (optical radiation) of upper waveguide 18 is split into an upper and lower waveguides 10 and 11 at the end of what is the first directional coupler with 50% of input power distributed to each. Then by the reciprocity of reverse delta-beta type directional coupler modulator, the output light (optical radiation) comes out from only the lower waveguide 19 at the end of what is the second directional coupler. In the bar state, when the bias voltage is Vb, the input light of an upper waveguide 18 propagates only to the upper waveguide 20 at the end of the second directional coupler because of a larger phase mismatch. Accordingly both cross and bar state can be controlled completely by signal voltages with a wide fabrication tolerance of the structural parameters.

Figure 2:
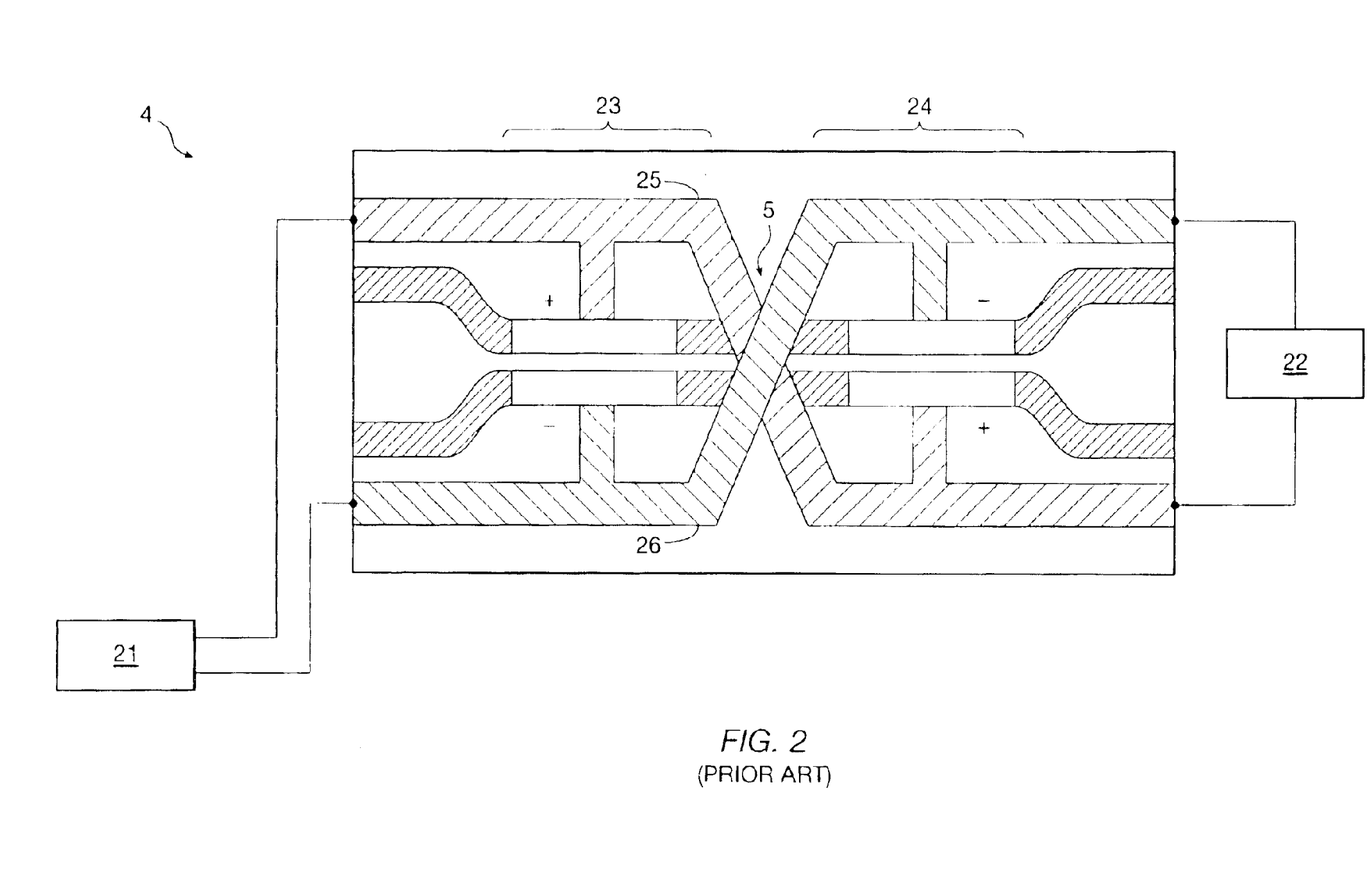
FIG. 2 is a prior art reverse delta beta type traveling-wave directional coupler modulator.

Dr. R. G. Waker et al. in an article entitled "Low-voltage, 50 Ω, GaAs/AlGaAs Traveling-wave Modulator with bandwidth exceeding 25 GHz," *Electronics Letters*, 9 November 1989 vol. 25 No. 23 pp. 1549–1550, have proposed a traveling-wave Mach-Zehnder electro-optic modulator to provide periodic capacitive loading to a separate coplanar transmission line. Such a design is depicted by FIG. 2, which shows a prior art reverse delta beta type directional coupler modulator 4 using such a traveling-wave electrode configuration. A modulation signal is supplied by one signal generator 21 and terminates at a load 22. In order to apply opposite sign signals for a first directional coupler 23 and a second 24 directional coupler, the traveling-wave electrodes 25, 26 must be bent and crossed at the center 5 as shown in FIG. 2. It is also strongly desired to completely isolate the first and second directional coupler electrically to obtain efficient phase mismatches. However it is very difficult to realize this structure without degradations of RF wave and optical transmission characteristics. The crossing of traveling-wave electrode induces the reflection of the RF wave and weak grounding.

However, a simple directional coupler modulator is difficult to fabricate because the chip length needs to be precisely controlled to be an odd number multiple of the coupling length to yield a good extinction ratio. U.S. Pat. No. 4,012,113 disclosed that a reverse delta-beta type directional coupler modulator is suited for practical application due to a wide fabrication tolerance. This reverse delta-beta type directional coupler modulator requires two sets of control elements to achieve a phase mismatch of opposite sign. However, it is difficult to form a traveling wave type electrode configuration using this structure. Thus, what is needed is an optical modulator with both a traveling wave electrode configuration and a directional coupler with a wide fabrication tolerance.

SUMMARY OF THE INVENTION

According to the invention, a directional coupler type optical modulator with traveling-wave electrodes is provided which includes a waveguides forming a first directional coupler region, a wave coupling region, typically a waveguide crossover coupling region, a second directional coupler region, and a set of traveling-wave electrodes which are without crossover and are outside and adjacent the waveguides. The electrodes of each directional coupler are preferably connected to the traveling-wave electrodes via air-bridges. The waveguide structures are of the P-I-N type having a common N-type conducting layer which provides delta-beta operation of the directional coupler, and both cross and bar states are controlled by a single input signal. The proximate regions operate as a directional coupler controlled by the waveguide electrode bias voltages provided through the traveling wave electrode, such that they switch the optical signals propagating through the waveguides to each other. Two directional couplers are cascaded through a waveguide cross coupling region. The traveling wave electrodes propagate high-speed electronic signals from a signal input pad to the waveguide electrodes through the air-bridge structures. These two sets of directional couplers with waveguide cross coupling and traveling wave electrodes operate as a complete optical modulator.

According to the present invention, a reverse delta-beta type directional coupler modulator is formed by use of a single traveling-wave electrode configuration without crossover of the electrodes. By use of a crossing waveguide instead of a crossing electrode between two directional couplers, large electrical losses and reflection by the electrical crossing in RF range can be eliminated. A directional coupler, a Multi-Mode Interference (MMI) coupler or an X coupler using an optical crossing according to the invention produces low loss and negligibly small reflection characteristics. As a result, a high cut-off frequency and a very low drive voltage modulator can be achieved using the reverse delta beta type directional coupler modulator configuration.

In a specific embodiment of the present invention, the first pair of electrodes or second pair of electrodes on the optical waveguides is divided and disposed along the longitudinal axis, and each electrode is connected by an air-bridge individually to the outer traveling wave electrode. By configuring the electrodes on the waveguide as described, the electrical signal effectively propagates from the outer traveling wave electrode to each electrode on the optical waveguide when the period spacing of the electrode is smaller than the length of a period of the input electrical signal. As a result, this configuration achieves a small electrical attenuation even for a longer optical modulator.

Another specific embodiment of the present invention is one employing a ridge waveguide as the optical waveguide. According to the invention, the propagating light is well confined in an I-type low loss core region of the optical waveguide to reduce optical propagation loss so that coupling length of the pair of waveguides is easily controlled.

Another specific embodiment of the present invention is one employing a ridgeless waveguide as the optical waveguide. Optical coupling can be partially controlled by spacing between the waveguides sharing a common layer.

Another specific embodiment of the present invention is one employing a buried-hetero-structure (BH) waveguide as the optical waveguide. According to the invention, the propagating light is well confined in an I-type low loss core region of the optical waveguide to reduce optical propagation loss so that coupling length of the pair of waveguides is easily controlled.

Another specific embodiment of the present invention is one employing a directional coupler with cross state or a 2×2 MMI coupler or a X waveguide as the crossing waveguide. According to the present invention, a low loss crossing region of the two waveguides in a short length can be fabricated.

Another specific embodiment of the present invention is one wherein divided electrodes are isolated from each other by removing the doped upper waveguide layer. According to the present invention, the electrodes are completely isolated and a leakage current between each electrode is suppressed effectively. In this case, the electrical loss of traveling wave electrode is further reduced.

Still another specific embodiment of the present invention is one employing on bias electrode which is deposited on the conducting layer on the semiconductor substrate. According to the present invention, an under layer of a pair of waveguides of the first directional coupler and the second directional coupler can be biased independently.

Still another specific embodiment of the present invention is one wherein the optical modulator is composed of Class III-V compound materials or Class IV compound materials. According to the present invention, efficient refractive change or phase change is achieved and a low loss optical modulator is achieved by a well-confined layered structure.

The scope of the present invention will become apparent from the following detailed description when read in conjunction with the attached drawings.

DESCRIPTION OF SPECIFIC EMBODIMENTS OF THE INVENTION

Figure 3:
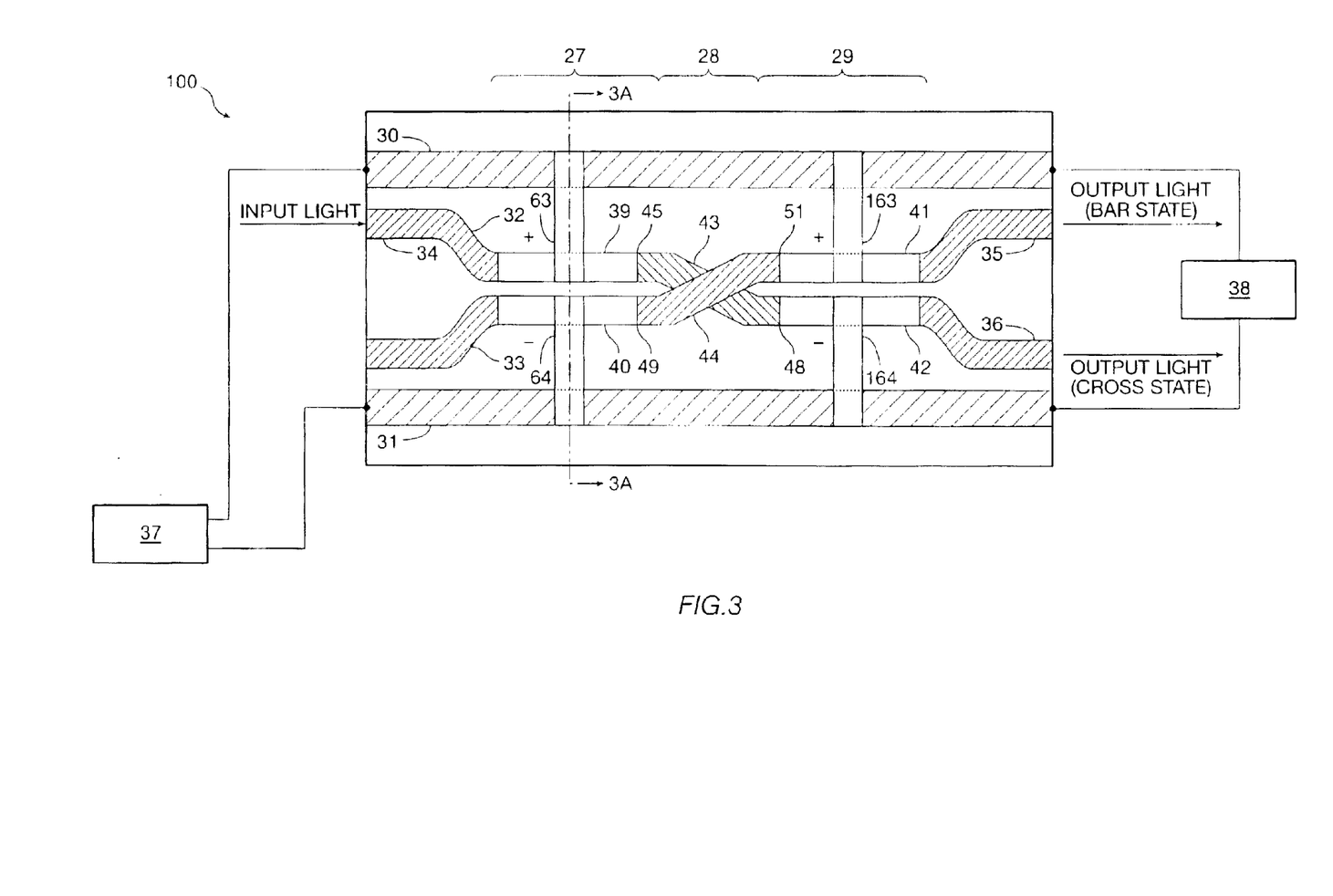
FIG. 3 is a directional coupler modulator according to a first embodiment of the present invention.
Figure 3A:
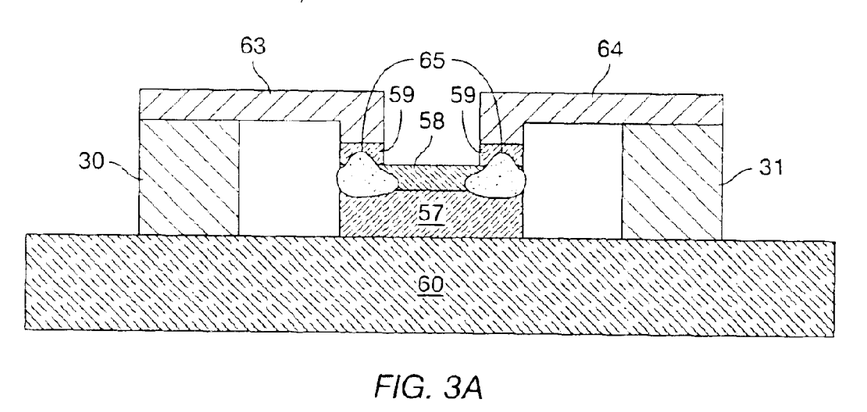
FIG. 3A is a cross-sectional view of a directional coupler modulator according to a first embodiment of the present invention.

FIG. 3 shows a directional coupler modulator 100 according to a first embodiment of the present invention. Herein, the optical modulator formed of optical waveguides 32, 33 includes a section defined as a first directional coupler 27, a section defined as a cross waveguide 28 and a section defined as a second directional coupler 29. Each directional coupler is of the delta beta type having two waveguides with a specific desired coupling length. The two optical waveguides 32, 33 cross one another at central segments 43, 44 corresponding to the cross waveguide 28 as shown in FIG. 3. Specifically, the upper output port at 45 of the first directional coupler 27 is connected to the lower input port at 48 of the second directional coupler 29. Similarly, the lower output port of the first directional coupler 27 at 49 is connected to the upper input port at 51 of the second directional coupler 29. In this central region, the two waveguide segments 43, 44 do not work as a directional coupler. The traveling-wave electrodes 30, 31 do not have any bending or crossing. The two traveling-wave electrodes 30, 31 are connected directly with no loss.

The optical directional modulator 100 of the invention can control both cross and bar states by an input voltage signal like a conventional reverse delta beta type directional coupler modulator. There is no need to use two input signals with opposite polarities. It should also be noted that the invention allows for one input signal drive and a traveling-wave electrode configuration.

The operation of the optical directional modulator 100 is as follows. With transmission, an electric field is applied to the electrodes 39, 40, 41, 42 on the directional coupler waveguide through a set of air-bridges 63, 64, 163, 164 to attain a delta-beta operational mode. However, in this state, the polarities of the first and second directional coupler modulators are the same (which differs from the conventional reverse delta-beta type directional coupler modulator). When the total length of the first and second directional coupler is larger than the coupling length of the directional coupler and shorter than three times the coupling length, path switching can be achieved effectively. At the bias voltage of Vb for low phase mismatches, the input light of an upper waveguide 34 is split into the upper and lower waveguides at the end of the first directional coupler, each with 50% input power. By adopting a cross waveguide 28 showed in FIG. 3, electrical signal polarities of the first and second directional coupler 27, 29 can be kept the same. This invention eliminates RF signal crossing, and improves RF performance. In the present modulator, the output light moves only in the upper waveguide 35 at the bias voltage of Vb. On the other hand, when the bias voltage is Vc, the input light of an upper waveguide 34 returns only to the upper waveguide at the end of the first directional coupler because of a larger phase mismatch. After propagation of light in the crossing waveguide, the light propagates into the lower waveguide of the second directional coupler. In the second directional coupler, the bias voltage of Vc is also applied as shown in FIG. 3. Then the output light at the end of the second directional coupler returns to the lower waveguide 36. Accordingly both bar and cross states can be controlled completely by signal voltages with a wide fabrication tolerance of the structural parameters.

Figure 4:
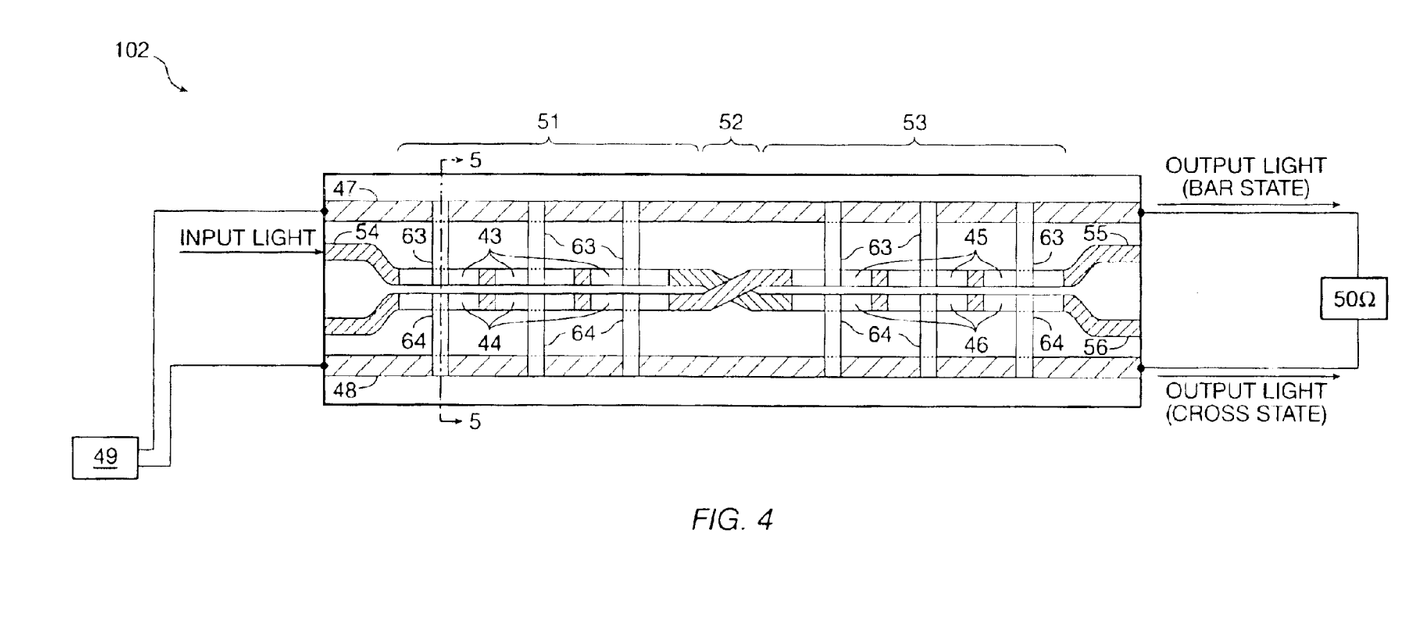
FIG. 4 is a directional coupler modulator according to a second embodiment of the present invention.

In order to work properly, the lengths of the electrodes 39, 40, 41, 42 as shown in FIG. 3 must be shorter than the wavelength of the electrical signal through the traveling-wave electrodes 30, 31, because longer electrodes seriously affect the traveling-wave characteristics and induce a large amount of transmission loss. FIG. 4 shows a directional coupler modulator 102 according to a second embodiment of the present invention which has a structure that overcomes such difficulty. The electrodes are divided and electrically connected to each directional coupler as shown in the figure as two sets of triple segments 43, 44 and 45, 46. Each electrode segment is connected to outer traveling-wave electrode strips 47, 48 independently through an air-bridge 63, 64. An electrical drive signal from the signal generator 49 is applied to the input port of each of the traveling-wave electrodes 47, 48 and then is propagated to each electrode 43, 44, 45, 46 through the respective traveling-wave electrode 47, 48 and the air-bridge 63, 64. The electrical signal is terminated by a load resistance 50.

The optical waveguide topology is the same as in FIG. 3. The First directional coupler 51, the cross waveguide region 52, and the second directional coupler 53 are cascade connected. Thus, incident light coupled to the input waveguide 54 is switched to the output waveguide 55 or 56 by the input signal voltage.

This configuration leads to a low loss electrical transmission where the modulator is long compared to the wavelength of the signal of interest. An input impedance can be maintained to a desired value (typically 50 ohm) even for a longer modulator, based on a similar configuration.

Figure 5:
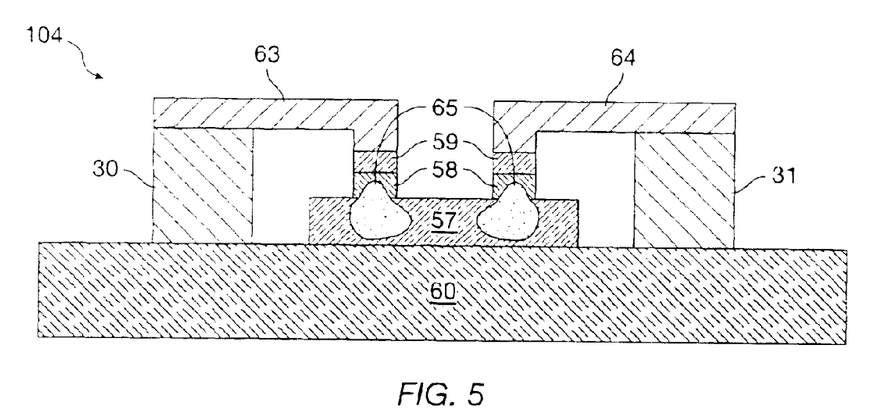
FIG. 5 is a cross-sectional view of a directional coupler modulator according to a third embodiment of the present invention.
Figure 5A:
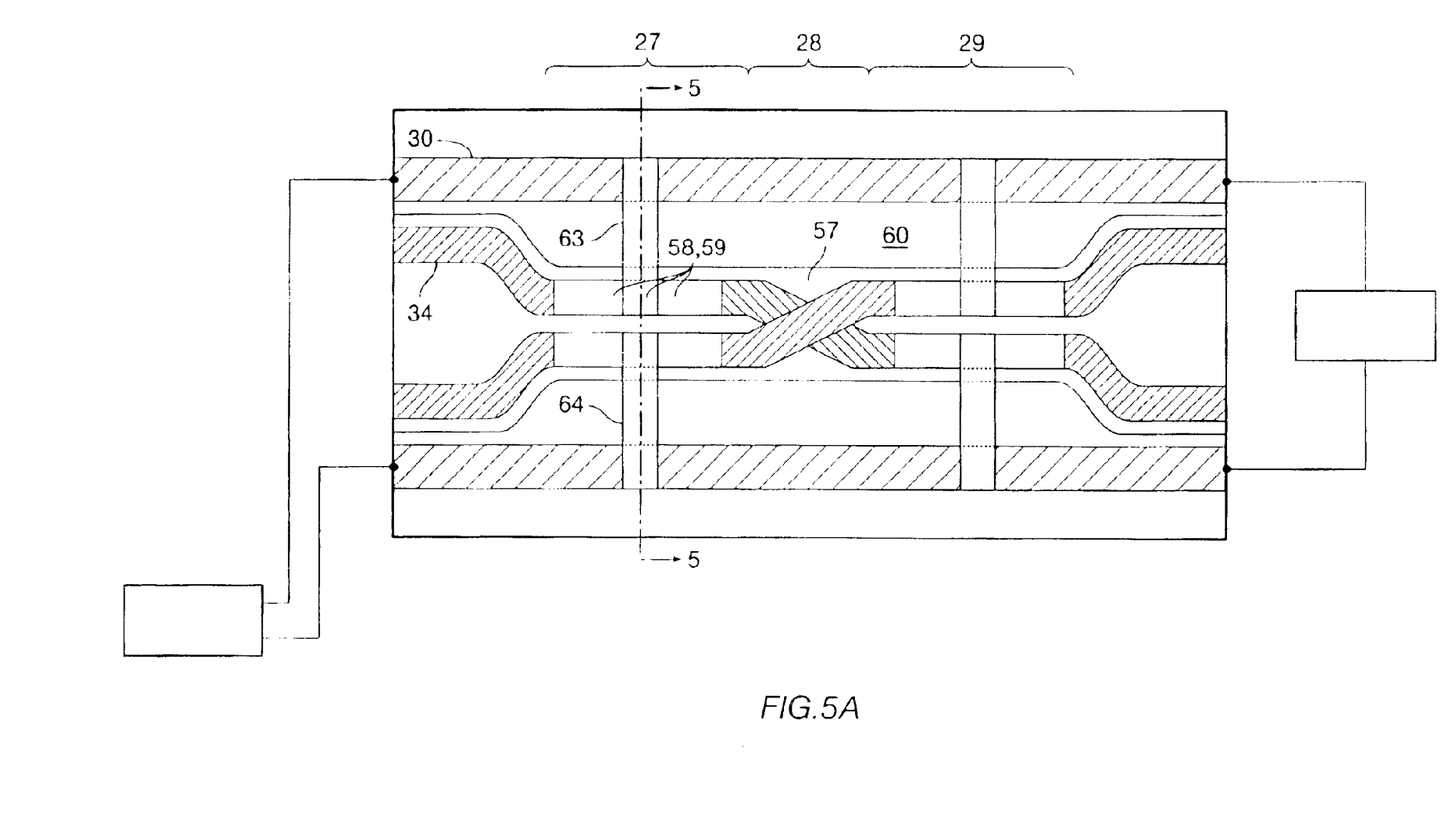
FIG. 5A is a top view of a directional modulator according to the third embodiment of the invention.

FIG. 5 shows a cross-sectional view of a directional coupler modulator 100 across the center of the element, which corresponds to the position for example of section 5—5 of FIG. 5A, according to a third embodiment of the invention. In this structure, the optical waveguide employs a ridge waveguide structure. An N-doped conducting waveguide layer 57, an I-core layer 58 and a P-cladding layer 59 which serves as an electrode are disposed on a substrate 60. The electrical signals are fed from the traveling-wave electrodes 30, 31 through air bridges 63, 64 to the P-cladding layer. The air bridge structure allows the drive voltage to be minimized by keeping the electric field well confined within the I-type region, and the N-type layer is preferably kept completely floating to both the outer electrodes for DC-bias. The electrode is separated from the N-type layer and is coupled directly to the P-type layer. Although an insulative layer could be used instead of an air bridge, the thickness would need to be much greater than is suited to the selected semiconductor fabrication process. For this reason the air bridge structure is preferred. The optical beams represented by regions 65 are confined in the I-core layer 58 by the higher refractive index in the structure of layer 58, but they can couple with the adjacent waveguide through the N-doped lower waveguide layer 57. On the other hand, a microwave signal from the traveling-wave electrodes 30, 31 fed by the air-bridges 63, 64 is concentrated only in the I-core layer 58 of each waveguide by the P-I-N structure. Thus, an overlap between the optical intensity and microwave signal intensity in the I-core layer increases and reduces the drive voltage as the coupling length is adjusted.

Figure 5B:
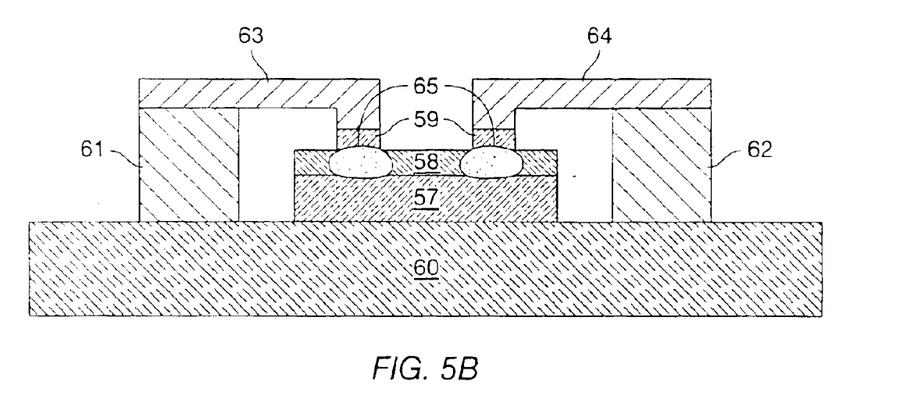
FIG. 5B is a cross section of a directional coupler modulator according to a fourth embodiment of the present invention.

FIG. 5B is a modification of the structure of FIG. 5 in a further embodiment in which there is no ridge structure. The ridgeless structure involves a common I-layer 58 extends across and upon the common N-layer 57. Removal of the portion of the I-layer 58 between the bridges is not necessary. Furthermore, the optical coupling occurs directly in this layer. It is to be noted that the coupling strength between the two waveguides can be specified by defining the separation between the two waveguides. Optical confinement in the I-layer can be kept quite large.

Figure 6:
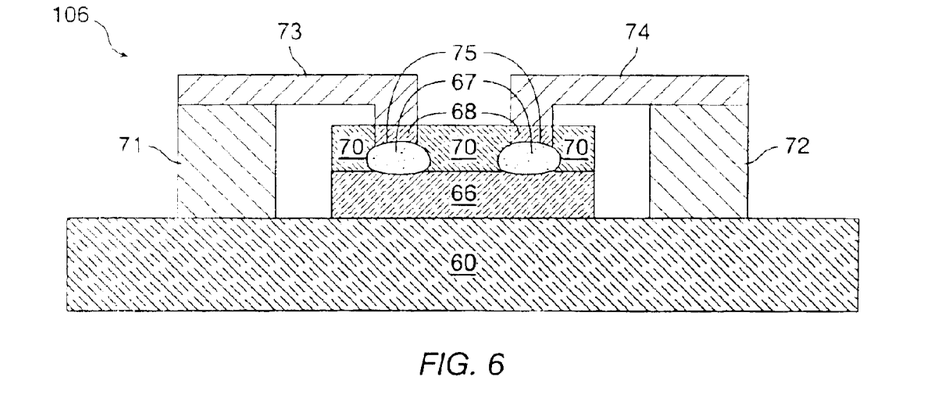
FIG. 6 is a cross section of a directional coupler modulator according to a fifth embodiment of the present invention.

FIG. 6 shows a cross-sectional view at the directional coupler of a directional coupler modulator 106 according to a fifth embodiment of the invention. In this embodiment, the optical waveguide uses a buried-hetero-structure (BH) waveguide structure. An N-doped conductive waveguide layer 66, an I-core layer 67 and a P-cladding layer 68 are deposited on the substrate 60. The side regions of the I-core layer are completely buried by a semi-insulating cladding layer 70. The electrical signals are fed from the traveling-wave electrodes 71, 72 through the air-bridges 73, 74. The optical beam represented by regions 75 is confined in the I-core layer 67 by the higher refractive index in the structure 67, and it can couple with the adjacent waveguide through the semi-insulating buried layer 70. On the other hand, a microwave signal from the traveling-wave electrodes 71, 72 fed by the air bridges 73, 74 concentrate only in the I-core layer 67 of each waveguide by the P-I-N structure and buried layers. Thus, an overlap between the optical intensity and micro-wave signal intensity in the I-core layer increases and reduces the drive voltage while the coupling length is adjusted by changing the separation of the pair of optical waveguides. Compared with the ridge waveguide structure, the BH optical waveguide structure is more complicated, but it exhibits optically a lower insertion loss due to tight light confinement.

Figure 7:
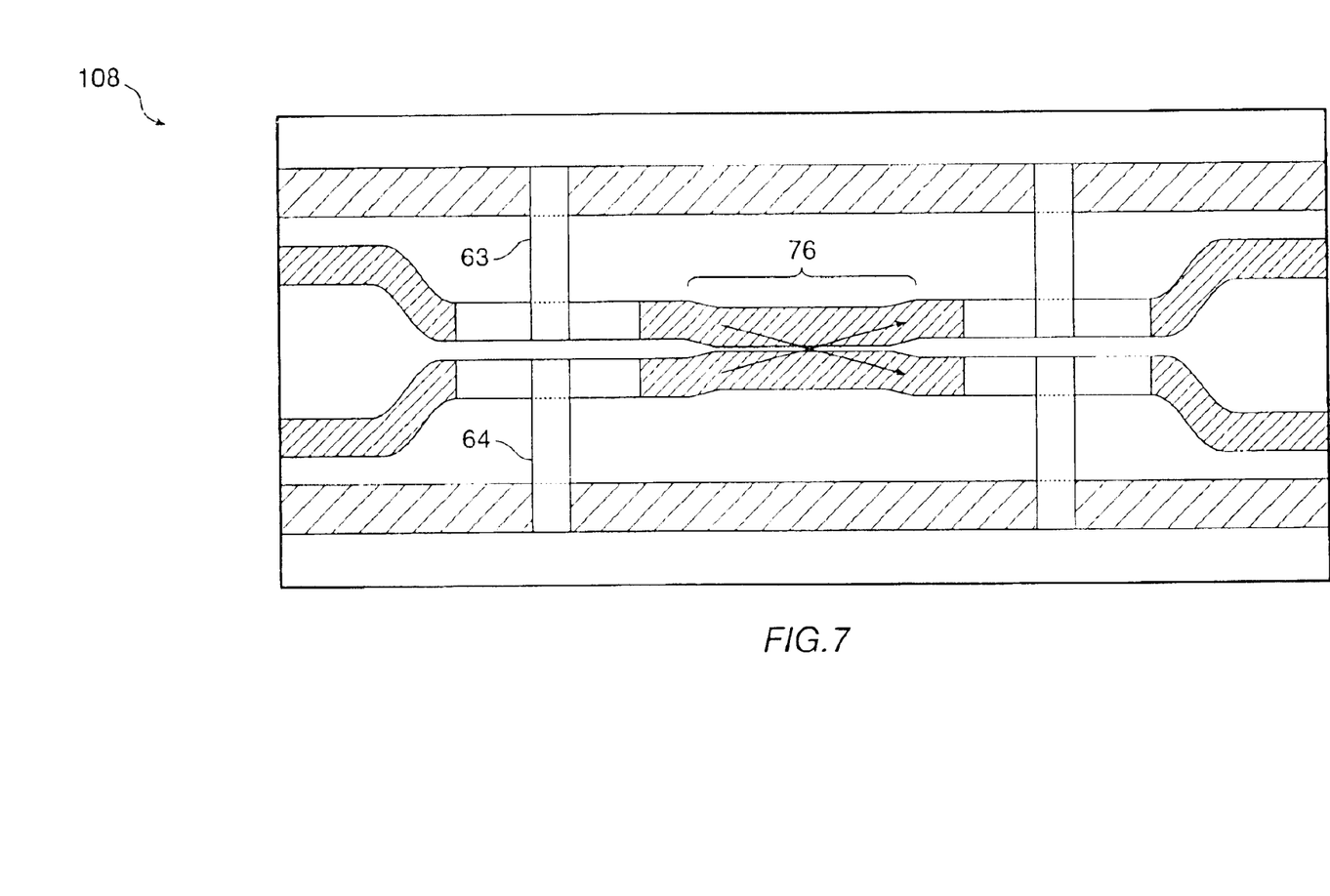
FIG. 7 is a directional coupler modulator according to a sixth embodiment of the present invention.

FIG. 7 shows a directional coupler modulator 108 according to a sixth embodiment of the invention, wherein instead of a cross waveguide, a conventional bar state directional coupler region 76 is used in the corresponding region. It is noted that the separation of the pair of waveguide segments is reduced compared to the waveguides in the first or second directional coupler regions. This structure leads to a shorter coupling length and provides a more compact modulator.

Figure 8:
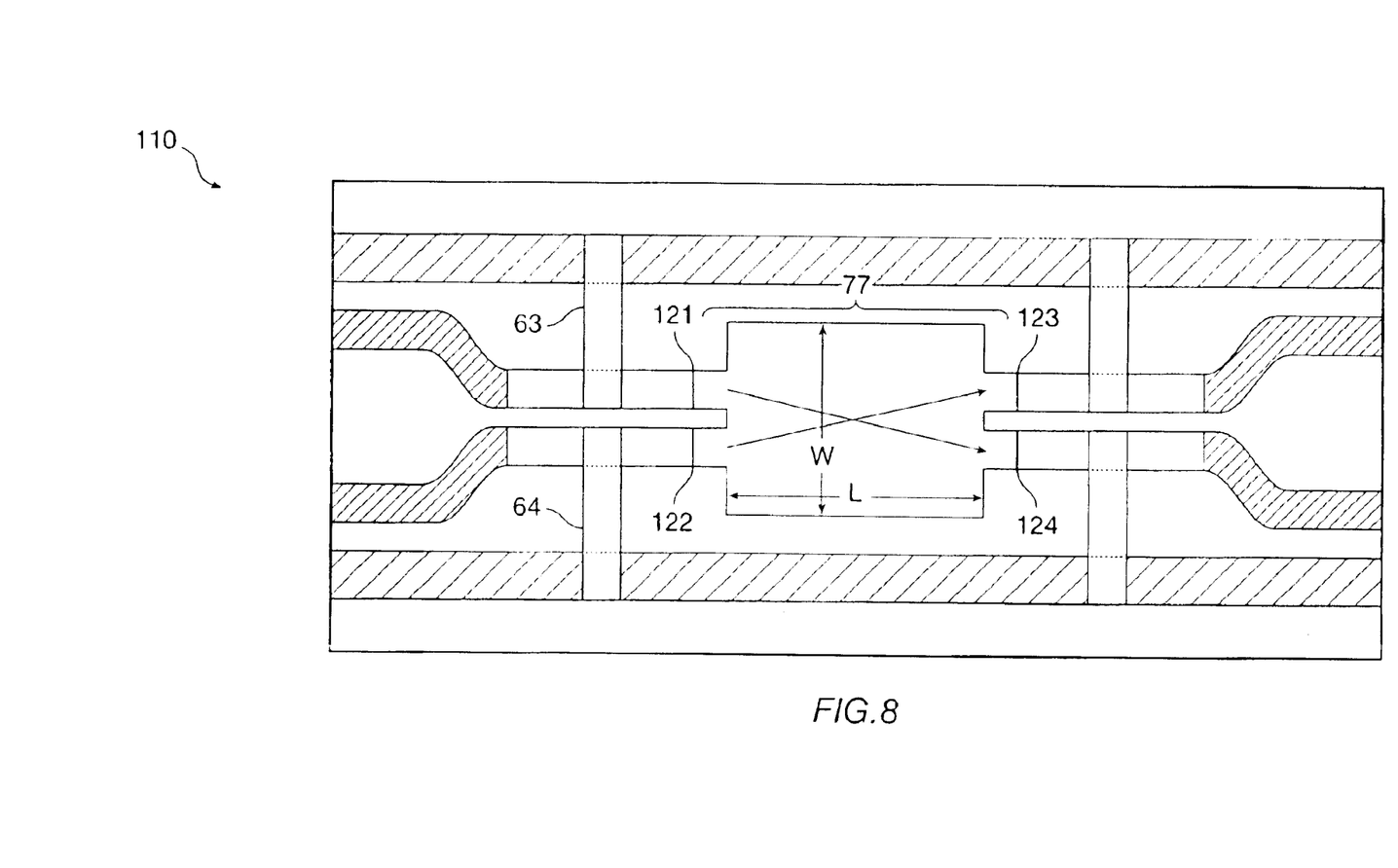
FIG. 8 is a directional coupler modulator according to a seventh embodiment of the present invention.

FIG. 8 shows a directional coupler modulator 110 according to a seventh embodiment of the invention, wherein a Multi-Mode-Interference (MMI) coupler 77 is employed with two input ports 120, 121 and two output ports 123, 124. By choosing a width W and a length L for the MMI coupler 77, mirrored images can be obtained at opposite waveguides as described by Dr. L. B. Soldano et. al., "Optical Multi-Mode Interference Devices Based oil Self-Imaging: Principles and Applications" Journal of Lightwave Technology, vol. 13, No. 4, pp. 615–627, April 1995. Thus using the same layered structure of the directional coupler region, a simple crossover waveguide can be built into a chip.

Figure 9:
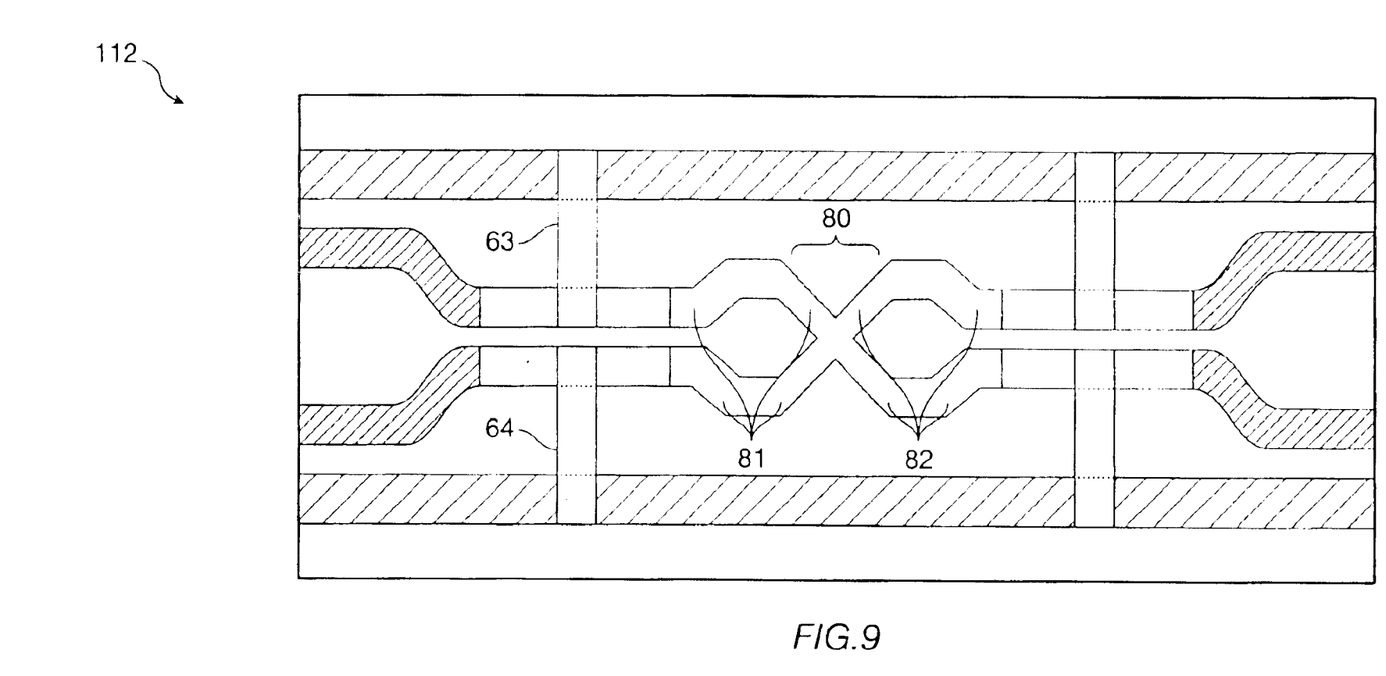
FIG. 9 is a directional coupler modulator according to an eighth embodiment of the present invention.

FIG. 9 shows a directional coupler modulator 112 according to an eighth embodiment of the invention. A simple X type cross waveguide 80 and bending waveguides 81, 82 are used in the coupling region. In this structure, a wavelength independent cross waveguide is obtained using a relatively simple structure, since there is a need not to control precisely the waveguide structural parameters required for directional couplers and MMI couplers.

Figure 10:
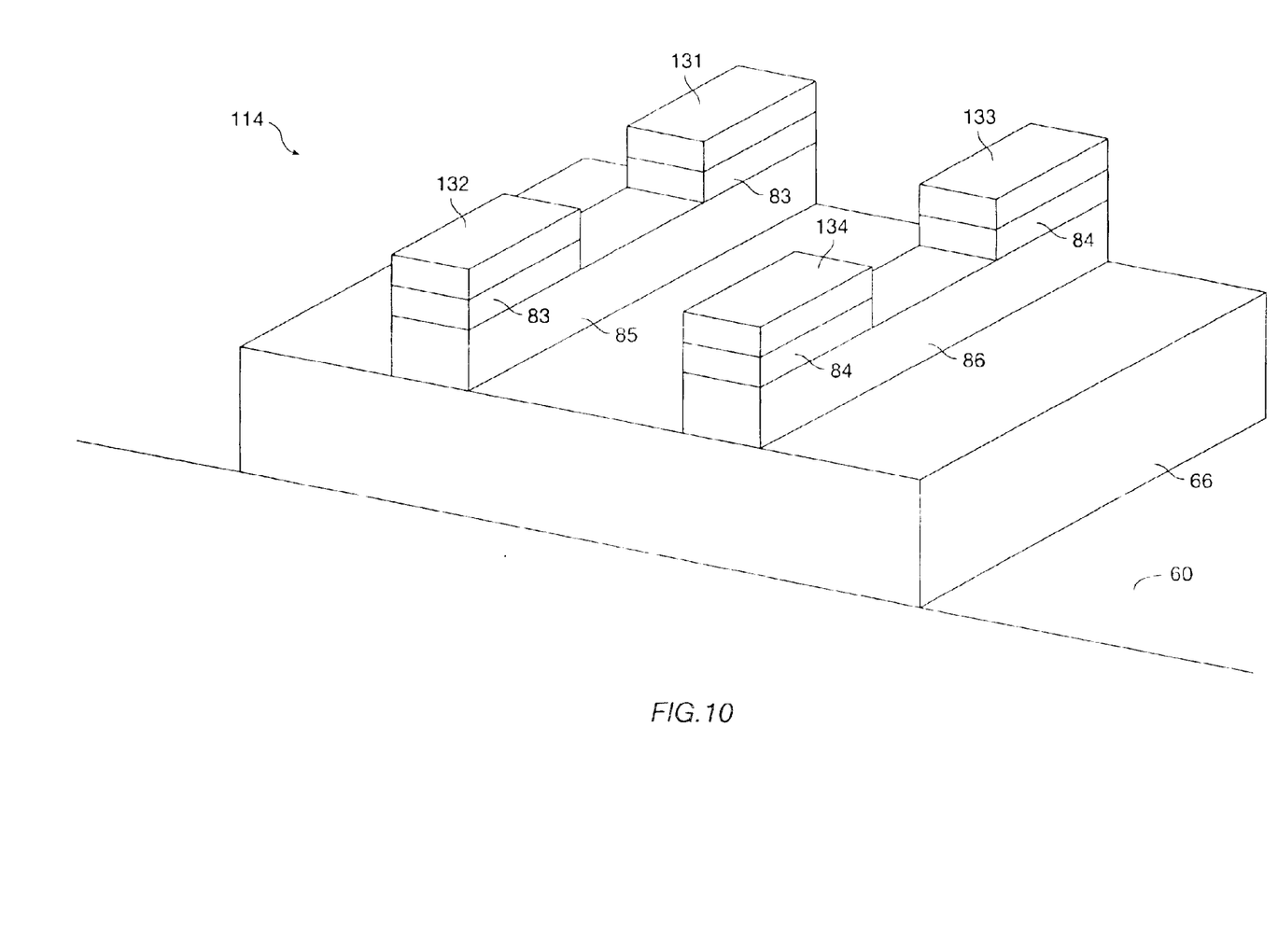
FIG. 10 is a directional coupler modulator according to a ninth embodiment of the present invention.

FIG. 10 shows a perspective view (not to scale) of a portion of a directional coupler modulator 114 according to an ninth embodiment of the invention. Traveling-wave transmission is significantly affected by the interaction of each electrode on the optical waveguide. To maintain good traveling-wave transmission characteristics, one can eliminate the interaction of those electrodes. When the isolation is not enough, the backward transmission is easily induced and degrades the electrical return loss. This suggests that each electrode should be isolated electrically. Referring to FIG. 10, P-clad layers 83, 84 are disposed only under electrodes 131, 132, 133, 134. Undesired P-clad layer material between the electrodes on the optical waveguide is removed. Thus the current between the electrodes is well suppressed. As a result, the interaction otherwise originated by such a leakage current is avoided. On the other hand, an optical beam in I-layers 85 and 86 and the guide layer 66 on the substrate 60 can propagate in this region without a large optical loss.

Figure 11:
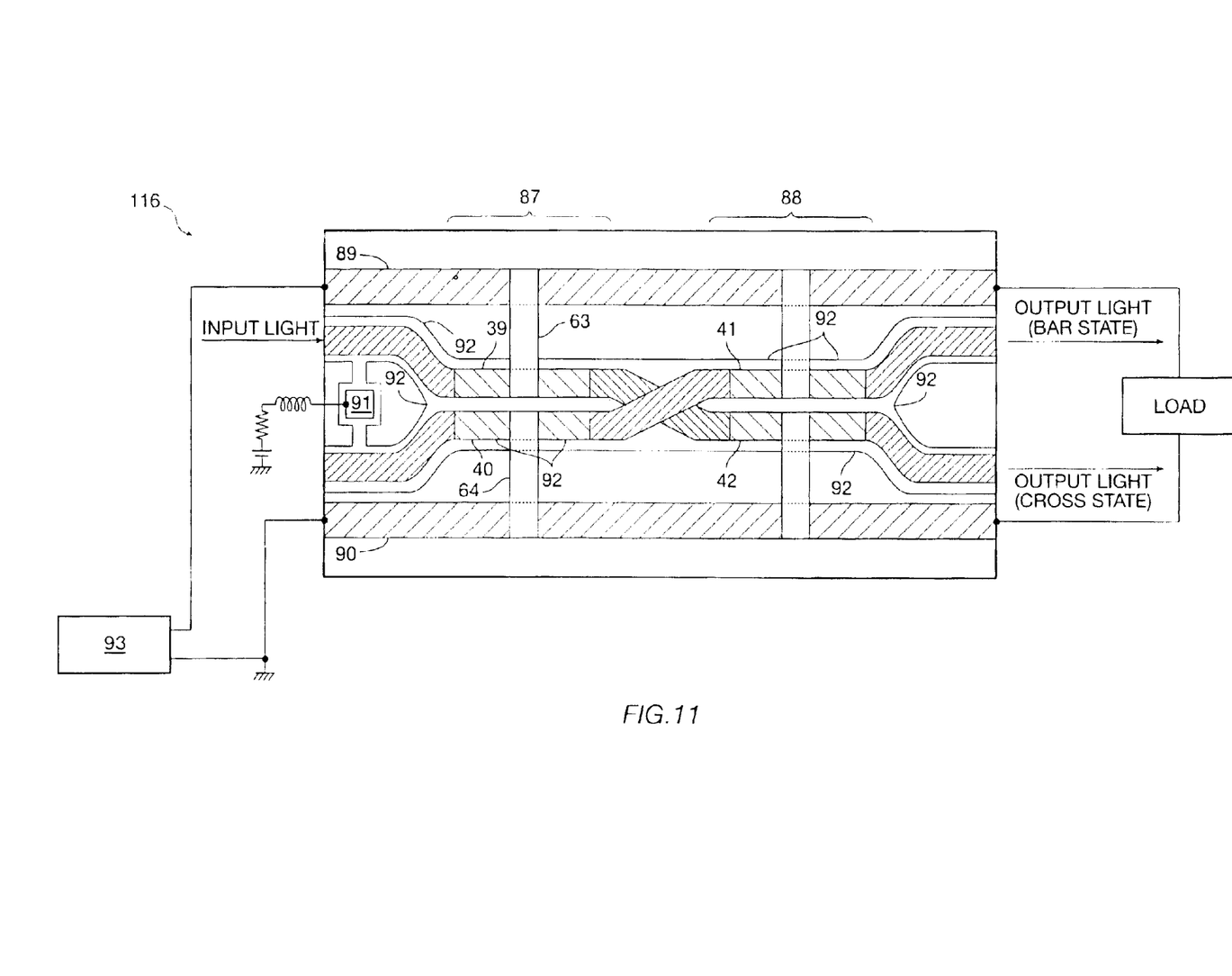
FIG. 11 is a directional coupler modulator according to a tenth embodiment of the present invention.

FIG. 11 shows a directional coupler modulator 116 according to a tenth embodiment of the invention. It is necessary to provide two directional coupler regions 87, 88 to operate as a delta-beta switched directional coupler. In each directional coupler, the magnitude of the refractive change of the waveguides should be the same and the polarity should be opposite. Thus the change in the electric field of the electro-optic I-layer (not shown) should be controlled to obtain desired refractive index changes. The change in the electric field can be induced by the electrodes 39, 40, 41, 42 connected to outer traveling-wave electrodes 89, 90. However, the inventive modulator 116 is based on a P-I-N semiconductor structure and has a diode characteristic. A bias electrode 91 is deposited on the N-doped layer 92 as shown in FIG. 11, and this doped N-layer is also disposed below the whole optical waveguide. Therefore this electrode 91 causes all waveguides to be in a negative bias region of a diode characteristic during the modulation mode. It should be noted that an applied voltage of the bias electrode is half of the RF input signal from the signal generator 93 for the negative bias condition.

The present invention is not limited to the embodiments described heretofore. Various alternatives and modifications may be made without departing from the scope of the invention. It is therefore not intended that the invention be limited, except as indicated by the appended claims.

What is claimed is:

1. A semiconductor optical modulator comprising:
 a) a first optical directional coupler on a semiconductor substrate;
 b) a second optical directional coupler on said semiconductor substrate;
 c) a first optical waveguide;
 d) a second optical waveguide;
 e) a wave-coupling region for the first waveguide and the second waveguide between the directional couplers;
 f) a pair of traveling-wave electrodes, said traveling-wave electrodes having no crossover; and
 g) two sets of air-bridge structures forming connections between the waveguide region and the traveling-wave electrodes.

2. The optical modulator according to claim 1 wherein the wave-coupling region includes an optical waveguide crossover.

3. The optical modulator according to claim 1 wherein the optical waveguides have proximate regions formed of P-I-N structures on a conductive semiconductor layer, the proximate regions operating as directional couplers controlled by bias voltages supplied to a waveguide electrode provided through a traveling wave electrode to switch optical signals propagating through the waveguides to each other and wherein the first directional coupler is cascaded with the second directional coupler through the waveguide coupling region.

4. The optical modulator according to claim 2 wherein the traveling wave electrodes are operative to propagate high-speed electronic signals from a signal input pad to the waveguide electrodes through the air-bridge structures.

5. The optical modulator according to claim 3, wherein the first pair of electrodes or the second pair of electrodes on the optical waveguides are divided and disposed along a longitudinal axis, wherein each electrode is connected by the air-bridge structures individually to the outer traveling-wave electrode.

6. The optical modulator according to claim 4, wherein the optical waveguide is a ridge waveguide.

7. The optical modulator according to claim 5 wherein the optical waveguide employs a ridgeless waveguide structure.

8. The optical modulator according to claim 5, wherein the optical waveguide is a buried hetero-structure (BH) waveguide.

9. The optical modulator according to claim 5, wherein the wave coupling region is coupled to said directional coupler with a cross state.

10. The optical modulator according to claim 5, wherein the wave coupling region is a 2×2 multi-mode interference (MMI) coupler.

11. The optical modulator according to claim 5, wherein the wave coupling region is an X waveguide.

12. The optical modulator according to claim 5, wherein divided electrodes are electrically isolated from each other.

13. The optical modulator according to claim 5, wherein one bias electrode is disposed at least on the conducting layer on the semiconductor substrate.

14. The optical modulator according to claim 5, wherein structure of said optical modulator comprises Type III–V compound materials.

15. The optical modulator according to claim 5, wherein structure of said optical modulator comprises type IV compound materials.

* * * * *